US012612155B1

(12) United States Patent
Liu

(10) Patent No.: US 12,612,155 B1
(45) Date of Patent: Apr. 28, 2026

(54) APPARATUS OF VORTEX GENERATOR AND SPOILER

(71) Applicant: Wei Liu, Arlington, TN (US)

(72) Inventor: Wei Liu, Arlington, TN (US)

( * ) Notice: Subject to any disclaimer, the term of this patent is extended or adjusted under 35 U.S.C. 154(b) by 0 days.

(21) Appl. No.: 18/520,658

(22) Filed: Nov. 28, 2023

Related U.S. Application Data

(63) Continuation-in-part of application No. 17/531,766, filed on Nov. 21, 2021, now Pat. No. 11,866,156.

(51) Int. Cl.
B64C 23/06 (2006.01)

(52) U.S. Cl.
CPC .................................. B64C 23/06 (2013.01)

(58) Field of Classification Search
CPC ........ B64C 23/06; B64C 23/065; B64C 21/20
See application file for complete search history.

(56) References Cited

U.S. PATENT DOCUMENTS

| | | | | |
|---|---|---|---|---|
| 2,896,881 A * | 7/1959 | Attinello | .................... | B64C 9/38 |
| | | | | 244/207 |
| 2,941,751 A | 6/1960 | Gagarin | | |
| 2,946,540 A * | 7/1960 | Coanda | .................... | B64C 21/04 |
| | | | | 244/15 |
| 3,051,413 A * | 8/1962 | Pouit | ..................... | B64C 23/005 |
| | | | | 244/12.5 |
| 3,161,377 A * | 12/1964 | Balluff | ................. | B64C 21/025 |
| | | | | 244/12.5 |
| 3,525,486 A | 8/1970 | Wimpenny | | |
| 4,039,161 A | 8/1977 | Bauer | | |
| 4,082,479 A | 4/1978 | Rangi | | |
| 4,504,192 A | 3/1985 | Cyrus et al. | | |
| 4,848,701 A * | 7/1989 | Belloso | ................... | B64C 9/146 |
| | | | | 244/12.5 |
| 5,253,828 A * | 10/1993 | Cox | ........................ | B64C 23/06 |
| | | | | 244/214 |
| 6,131,853 A * | 10/2000 | Bauer | ..................... | F42B 10/62 |
| | | | | 482/13 |
| 7,878,457 B2 | 2/2011 | Narramore | | |
| 8,657,238 B2 * | 2/2014 | Fox | ........................... | B64C 9/24 |
| | | | | 244/214 |
| 11,407,498 B2 * | 8/2022 | Secinaro | ................. | B64C 23/06 |
| 2009/0020652 A1 * | 1/2009 | Rincker | ................. | B64C 23/06 |
| | | | | 244/204 |
| 2016/0083083 A1 * | 3/2016 | Bordoley | ................ | B64C 21/10 |
| | | | | 244/200.1 |
| 2017/0137116 A1 * | 5/2017 | Ireland | .................... | B64C 23/06 |
| 2019/0315459 A1 * | 10/2019 | Langenbacher | .......... | B64C 3/54 |

* cited by examiner

*Primary Examiner* — Tye William Abell

(57) ABSTRACT

This invention is an apparatus of vortex generator and spoiler that functions as vortex generators and spoilers by ejecting air streams or fluid streams in a predetermined position and in a predetermined arrangement and this apparatus can be controlled by pressure differentials between at least two predetermined areas or through the movement, including fully or partial deployment, retraction, and rotation, of an affiliated dynamic surface, such as the leading-edge slat or the trailing-edge flap, for the purpose of achieving desired aerodynamic or fluid-dynamic performances, such as avoiding air flow separations over aircraft wings and automotive spoilers or preventing out-of-control operations of wind turbine blades.

3 Claims, 6 Drawing Sheets

APPARATUS OF VORTEX GENERATOR AND SPOILER

CROSS-REFERENCE TO RELATED APPLICATIONS

This is a continuation-in-part of application Ser. No. 17/531,766, filed, with title "Apparatus for Vortex Generation to Improve Aerodynamics" and naming Wei Liu as inventor(s) the entire content of which is hereby incorporated herein by reference.

STATEMENT REGARDING FEDERALLY SPONSORED RESEARCH OR DEVELOPMENT

This is solely my personal invention and is not made with or related to any federal funding.

REFERENCE TO A "SEQUENCE LISTING"

None

BACKGROUND OF THE INVENTION

In pursuit of the best possible aerodynamic performance, various devices, such as leading-edge slats, trailing-edge flaps, and vortex generators, have been invented and utilized. Nowadays, vortex generators have been commonly used on low-speed full-sized airplanes and gliders. They have also been used on radio-controlled airplanes to prevent or delay stall, improve take-off and landing performance, etc. Moreover, vortex generators have also been used on high-performance cars. In fact, vortex generators, in the form of turbulator tapes, are readily available for many, if not all, motor vehicles, including minivans.

Various types of vortex generators are capable of offering special utilities in their respective applications and function relatively well as intended. Nevertheless, they have limitations and disadvantages. For instance, vortex generators in the form of vanes are not retractable and suffer from one disadvantage, which is that they increase drag consistently, thus rendering them most suitable for low-speed full-sized airplanes and radio-controlled airplanes. A significant amount of effort has been made to explore deployable vortex generators.

The traditional spoilers employ rigid plates that are raised or lowered by mechanical, pneumatic, electric mechanism, or other control mechanisms. Such an approach has worked well for full-scale gliders and some transport airplanes, e.g., C-17 transport aircraft. What is important to realize is that little effort has been made to create a combo device that operates as a vortex generator as well as a spoiler (also known as lift spoiler or lift dumper). This absence is especially significant.

By using pneumatic types of vortex generator/spoiler (that is, the types that use air jets and airstreams to create vortices and to spoil lift), this invention is intended to create an apparatus by combining the application of airstream vortex generators with the application of spoilers; and in doing so, said apparatus is intended to replace hefty and complicated traditional spoilers with nozzle means (also lift-body nozzle means) for ejecting at least one airstream (or water/fluid stream) that serves as a vortex generator and/or a spoiler, depending on the operational needs. Furthermore, it is also the intention of this invention to control the operation of said apparatus (1) by the movement (including full or partial deployment, retraction, and rotation) of an affiliated dynamic surface, e.g., the leading-edge aerodynamic surface and/or the trailing-edge aerodynamic surface, (2) by using fully or partially (air or water/fluid) pressure differential between at least two predetermined areas, and/or (3) by other control mechanisms, including valves, reeds, etc.

BRIEF SUMMARY OF THE INVENTION

This invention is an apparatus of vortex generator and spoiler that functions as vortex generators and spoilers by ejecting air streams or fluid streams in a predetermined position and in a predetermined arrangement and this apparatus can be controlled by pressure differentials between at least two predetermined areas or through the movement, including fully or partial deployment, retraction, and rotation, of an affiliated dynamic surface, such as the leading-edge slat or the trailing-edge flap, for the purpose of achieving desired aerodynamic or fluid-dynamic performances, such as avoiding air flow separations over aircraft wings and automotive spoilers or preventing out-of-control operations of wind turbine blades.

DETAILED DESCRIPTION OF THE INVENTION

Figure 1:
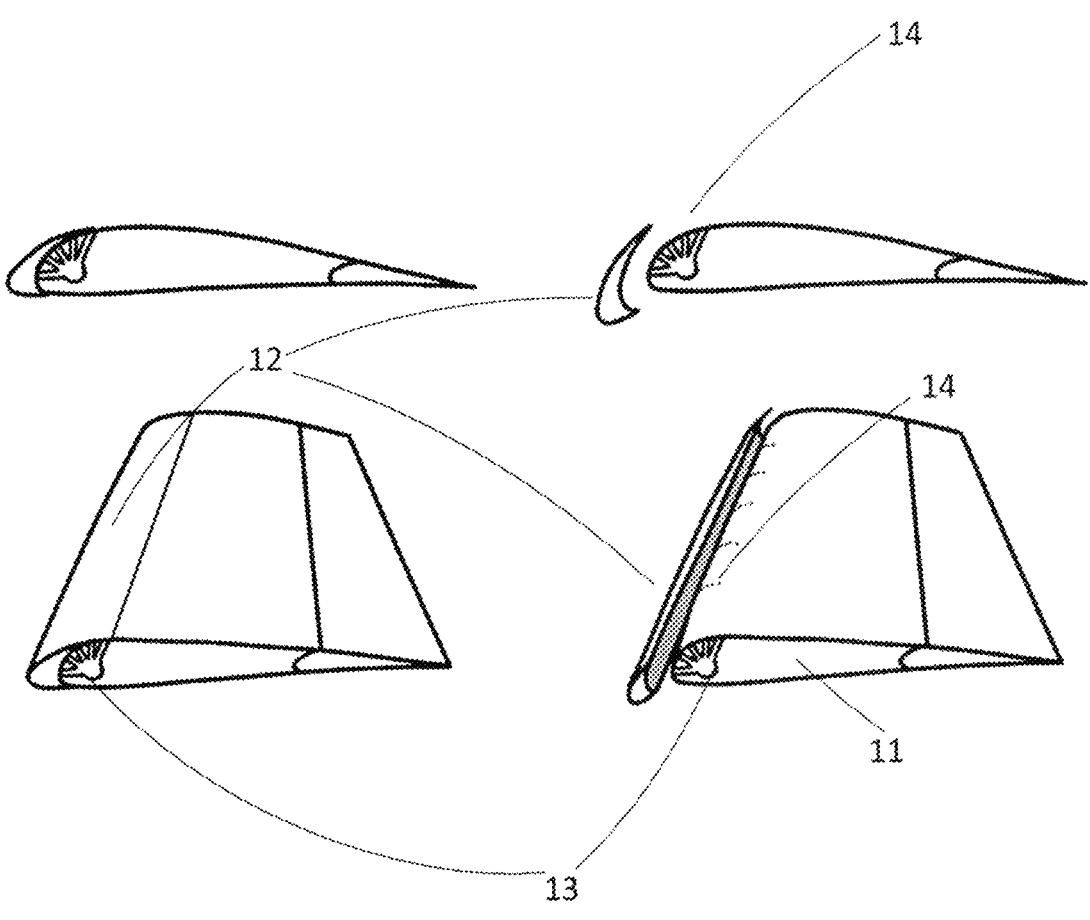
FIG. 1 shows a scheme of nozzle means near leading-edge aerodynamic surface as vortex generator and spoiler, with a predetermined air supply and a predetermined array of nozzle outlets.

It is worth noting that efforts to use air jets and airstreams to serve as a vortex generator or a spoiler have been steady and continuing over the years. R. Radespiel, M. Burnazzi, M. Casper and P. Scholz ("Active flow control for high lift with steady blowing", © Royal Aeronautical Society, January 2016, Volume 120, No 1223, pp 171-200) have extensively analyzed two strategies of blowing air jets for boundary layer controls: (1) tangential blowing of thin wall jets to overcome the adverse pressure gradients, and (2) oblique blowing of air jets designed to generate longitudinal vortices. J. Attinello has been granted a US patent in 1959 (U.S. Pat. No. 2,896,881), in which he invented the idea of achieving an aerodynamic air brake and lift spoiler through "directing a stream of air from within a lifting member at approximately perpendicularly to the air stream." And the stream of air is controlled by the rotation of pipes feeding the stream of air. S. Gagarin has also obtained a (U.S. Pat. No. 2,941,751) that uses a mechanism to extend or retract a spoiler and eject high-pressure air through openings on the spoiler, whereas the high-pressured air comes from a jet engine. J. Cyrus et al. have obtained a (U.S. Pat. No. 4,504,192) that uses air jet spoiler on Darrieus-type vertical axis wind-powered turbine to reduce its output power, a respectable application of airstreams as a spoiler. In this patent, the air jet comes from the ambient air being fed into the turbine blades from one end of the blades by centrifugal force during the rotation of the blades, and the air jet is controlled by a control unit. More recently, S. Prince, C. Badalamenti, and C. Regas ("The Application of Passive Air Jet Vortex-generators to Stall Suppression on Wind Turbine Blades", Wind Energy, Volume 20, Issue 1, January 2017, Pages 109-123) have studied the effect of passive air jet vortex-generators on stall suppression on wind turbine blades, and showed empirically that such air jet vortex generators are able to suppress the outset of trailing edge separation from single element airfoils tested in wind tunnel experiments with worthwhile performance benefits. Most recently, N. Secinaro invented a vortex generator passive deployment system (U.S. Pat. No. 11,407,498 B2), in which a vortex generator is deployed by a piston from its stowed position to its deployed position in response to an air pressure differential. E. Wolfgang, et al. (EP Patent: 3 053 827 B1) created an invention that uses the movement of a rudder on an aircraft vertical stabilizer to project and retract vortex generators, which is similar in nature to the invention of A. Bauer (U.S. Pat. No. 4,039,161). R. Cox (U.S. Pat. No. 5,253,828) invented vortex generators that project (i.e., protrude into boundary-layer flow) as a result of flap (or slat) deployment. However, similar to Wolfgang's invention and Bauer's invention, Cox's invention focuses only rigid vortex generators, as exemplified by his statement: " . . . the FAVG height can be designed to be a function of the flap deflection angle" (Paragraph 20). Efforts have also been made to assess the feasibility of smart vortex generators made with memory alloy, which are operational during take-off and landing and are stowed away during cruise by utilizing a function of shape memory alloy (Tadashige Ikeda, et al. "Smart Vortex Generator Using Shape Memory Alloy", 25th International Congress of The Aeronautical Sciences, 2006).

However, there seem to exist at least three deficiencies in the above-mentioned prior art. First, while it is true that blowing air jets through or over airfoils is not a new idea and research studies on such a topic abound, the existing analyses have focused on blowing airstreams in a tangential or pitched/skewed angles and on the consequential effects thereof, e.g., prevention of flow separation. Little mentioning has been made about how or if said airstreams can be controlled by the movement of any affiliated aerodynamic surface. Although R. Cox has obtained a (U.S. Pat. No. 5,253,828) that uses the deployment of leading-edge slats and trailing-edge flaps to extend or retract vortex generators, Cox's invention is solely focused on vortex generators that have rigid, inflexible structures. The prior art in this field, including that mentioned above, does not utilize the movement of the affiliated aerodynamic surfaces (e.g., leading-edge slats, trailing-edge flaps, etc.) as a control mechanism to activate, deactivate, or adjust the airstreams of vortex generators through the deployment, retraction, rotation of said aerodynamic surfaces. Second, air pressure differential between at least two predetermined areas, such as the upper and lower surfaces of an airfoil, is not utilized as a control mechanism. Third, air jets and airstreams have not been used (1) to control the actual operation of aeronautical devices, such as a glider's descend and roll of C-17 cargo transporter, and/or (2) to regulate/safeguard the operations of aeronautical devices such as wind turbine blades' rotations. The invention stated in my patent application is intended to overcome the fore-mentioned deficiencies. In simple words, no separate control mechanism is absolutely needed (even though a separate control mechanism could be employed), which will greatly simplify the design, structure, and control system of any embodiment, application, or product. In the case that a control device is needed, (air, gas, or water/fluid) pressure differential can be used for such a purpose, which also greatly simplifies the control mechanism. In addition, pressure differential is also used to create (air, gas, or water/fluid) streams as a vortex generator as well as a spoiler, serving two functions independently, supplementally, cooperative, intermittently, or alternately. Finally, vortices generation mentioned above is used to actually control the operating process of aeronautical/hydro/fluid devices, e.g., to avoid runaway operating situations of wind turbine blades.

Definitions And Clarifications

In order to fully and clearly explain all features, configurations, options, modifications, mechanism, principles, and functionalities related to this invention in my patent application, it is necessary to provide some much-needed definitions and clarifications related to the terms and concepts used in this patent application. And it is essential to understand that no limitation shall be interpreted from, inferred from, deduced from, derived from, implied by, or meant to exist by the verbiage practices and descriptive approaches throughout this "Detailed Description of the Invention", the claims listed below, and other parts of this patent application.

First of all, the term "lift body" includes any and all objects that have a predetermined shape and, when in relative motion against a non-solid medium, including air, gas, water, fluid, or a combination thereof, are capable of generating dynamic force; and therefore the term "lift body" includes, but is not limited to, an aircraft wing/airfoil, an aircraft horizontal tail, an aircraft vertical tail, a propeller, a stabilizer, an automotive spoiler, diffuser, a turbine blade, a fan blade, wind turbine blade, a sail, a hydrofoil, a vessel rudder (including rudders on boat, ship, yacht, watercraft, submarine), and a fluid-foil (e.g., an object to generate dynamic force in a fluid). It can be easily seen that wings of all types and configurations are naturally included in this definition of lift body. By the way, it shall also be understood that, for all the purposes and intentions of this patent application, no distinction is made between boat, ship, yacht, watercraft, and submarine and thus a rudder on any of these types of vessels is assumed to function under the same principles and serve the same purpose throughout this "Detailed Description of the Invention", in the claims listed below, and in other parts of this patent application. Moreover, in this "Detailed Description of the Invention", in the claims listed below, and in other parts of this patent application, the term "dynamic surface" includes any and all surfaces (including aerodynamic surfaces, hydrodynamic surfaces, fluid-dynamic, etc.) that are capable of generating dynamic force, when in relative motion against a non-slid medium, including, air, gas, water, fluid, or a combination thereof, for controlling, manipulating/influencing, or improving a vehicle's movement and/or direction, including leading-edge slat, a trailing-edge flap, a slotted leading-edge slat, a slotted trailing-edge flap, a wing slat, a wing flap, a flaperon, an aileron, an elevator, an elevon, a rudder, a spoiler. By the same logic, the term "pressure differential" that is used in this "Detailed Description of the Invention", the claims stated below, and other parts of this patent application includes pressure difference of said non-solid mediums, including pressure difference in air, gas, water, fluid, or a combination thereof. It is also important to bear in mind that when pressure differential is used, it may be used fully or partially for its intended purpose or functionality in this "Detailed Description of the Invention", the claims listed below, or other parts of this patent application, unless explicitly stated otherwise. It logically follows that the term "stream" shall be understood as stream of said non-solid mediums, and covers the same realm, carries the same meaning, serves the same purposes, and operates under the same principles as the term "airstream", the term "hydro-stream", and the term "fluid-stream" do throughout this "Detailed Description of the Invention", the claims listed below, and in other parts of this patent application. Equally important is the notion that said air jets/airstreams can be provided by a predetermined air supply, including air supply from ram air effect, air supply via centrifugal force, air supply from a jet engine, air supply from air tank/pump/compressor/fan as well as by air pressure differential between at least two predetermined areas.

As could be easily seen from the contents stated above, this invention is intended to cover all examples, embodiments, applications, and products applicable for all non-solid mediums. The same attributes, including underlying principles, operating mechanism, features, designs, functionalities, shapes, configurations, structures, orientations, and array, are also equally applicable for other non-solid mediums. In this "Detailed Description of the Invention", the claims listed below, and other parts of this patent application, the air-related terms, including "air", "airfoil", "aerodynamic surface", "airstream", "air pressure", and "air density", are used extensively solely for the purpose of clearly illustrating the underlying principles and operational mechanism of this invention while achieving verbiage brevity without loss of determinate meaning. Examples of air-based embodiments that employ air-jets/air-streams (i.e., pneumatic type) are extensively employed for the same purpose throughout this "Detailed Description of the Invention", the claims listed below, and other parts of this patent application. The term "air jet" and the term "airstream" are meant to convey the same meaning, operate under the same principles, and are used interchangeably in this "Detailed Description of the Invention", the claims listed below, and other parts of this patent application. Once again, no limitation shall be interpreted from, inferred from, derived from, or implied by the afore-mentioned verbiage practices and descriptive approaches used throughout this "Detailed Description of the Invention", the claims listed below, and other parts of this patent application. And to the same end, no limitation is meant to exist either.

Second of all, the term "vehicle" as used in this "Detailed Description of the Invention", the claims listed below, and other parts of this patent application includes vehicles of any and all types, be they airborne vehicles, land-based vehicles, water-based/ocean-going vehicles, powered or unpowered (temporarily, permanently, or intermittently), or a combination thereof. Furthermore, the realm of water-based/ocean-going vehicles includes any and all types and variations, including ships, boats, sailboats, yachts, crafts, watercrafts, amphibian, etc. Additionally, the term "vortex generator"

that is used in this "Detailed Description of the Invention", the claims stated below, and other parts of this patent application includes, but is not limited to, the realm of "turbulator" as well as the realm of "vortex generator." As Ballade Sports (a manufacturer of turbulators) puts it skillfully, "the turbulator acts as a small vortex generator . . . " As such, there is no difference in nature between a vortex generator and a turbulator as used throughout this patent application. Furthermore, the term "spoiler" that is used in this "Detailed Description of the Invention", the claims listed below, and other parts of this patent application includes, but is not limited to, spoilers used on airborne vehicles (also called "lifter spoilers" or "lift dumpers") and automotive spoilers used on land-based vehicles. A viable embodiment of this invention is a spoiler on a hydro-foil that is in water or fluid to assist a vehicle or a submersible or a semi-submersible vehicle. It is worthwhile to note that the term "automotive spoiler" used in this "Detailed Description of the Invention", the claims listed below, and other parts of this patent application includes, but is not limited to, spoiler devices (on land-based vehicles, including cars, trucks, and other land-based motorized, and non-motorized vehicles) "whose intended design function is to 'spoil' unfavorable air movement across a body of a vehicle in motion . . . (Wikipedia.org)."

Third of all, it is important to understand that said apparatus of this invention may comprise one entity or a plurality of entities. In the case of one entity, said one entity may function as a vortex generator, a spoiler, or a combination thereof continuously, cooperatively, interchangeably, intermittently, or alternately. An exemplary embodiment of this approach is that said apparatus installed near the trailing-edge of an aircraft wing works as a vortex generator to prevent airflow separation during the takeoff phase of aircraft flight and then operates as a spoiler/airbrake during the landing phase to reduce the possibility of bouncing off the runway and to shorten landing run. In the case of a plurality of entities, said plurality of entities may operate as vortex generator(s), spoiler(s), or a combination thereof. Said vortex generator(s) and said spoiler(s) can be separate entities in one embodiment, an application, or a product, which can operate continuously, interchangeably, independently, cooperatively, supplementally, intermittently, or alternately. For instance, one entity functions as a vortex generator while the other entity operates as a spoiler or both entities works as vortex generators or spoilers. An exemplary embodiment would be that said vortex generator is employed near/on the leading edge of an airfoil and said spoiler is installed near/on the trailing edge of the same airfoil, and both said vortex generator and said spoiler can operate cooperatively or independently as needed for an optimal aerodynamic performance, as could be inferred from the configuration graphically depicted in FIG. 6.

Fourth of all, in this "Detailed Description of the Invention", said claims listed below, or other parts of this patent application, for the purpose of achieving verbiage brevity without loss of determinate meaning, the singular may also include the plural and vice versa, the words "and" and "or" shall be interpreted as both conjunctive and disjunctive; the word "any" means "any and all"; and the word "all" means "any and all", unless explicitly specified; and the term "a" and the term "one" may also include "many" and "plurality of", as the situation dictates. It is important to keep in mind that no limitation shall be interpreted from, inferred from, deduced from, derived from, implied by, or meant to exist by such verbiage practices and descriptive approaches.

Operating Principles, Mechanism, And Embodiments

Figure 2:
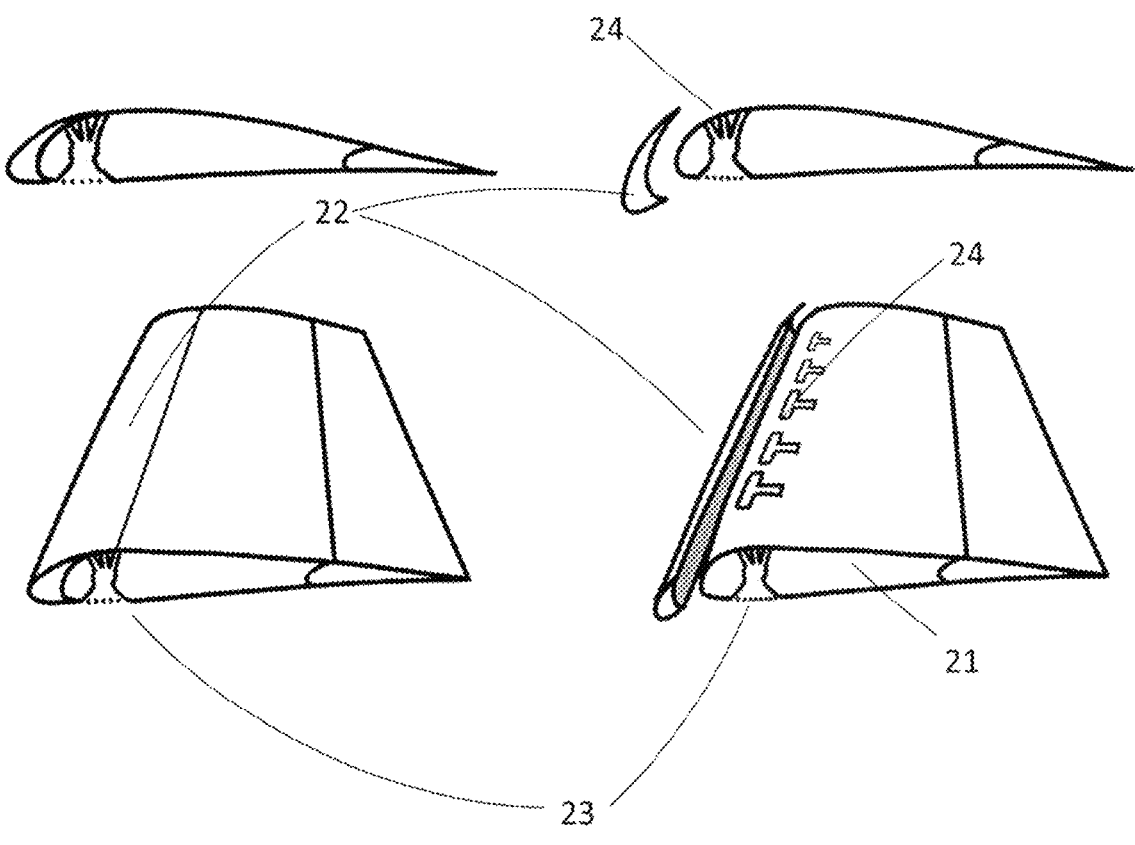
FIG. 2 illustrates a scheme of nozzle means near leading-edge aerodynamic surface as vortex generator and spoiler, with air pressure differential for air supply and composite-shaped nozzle outlets in a predetermined arrangement.
Figure 3:
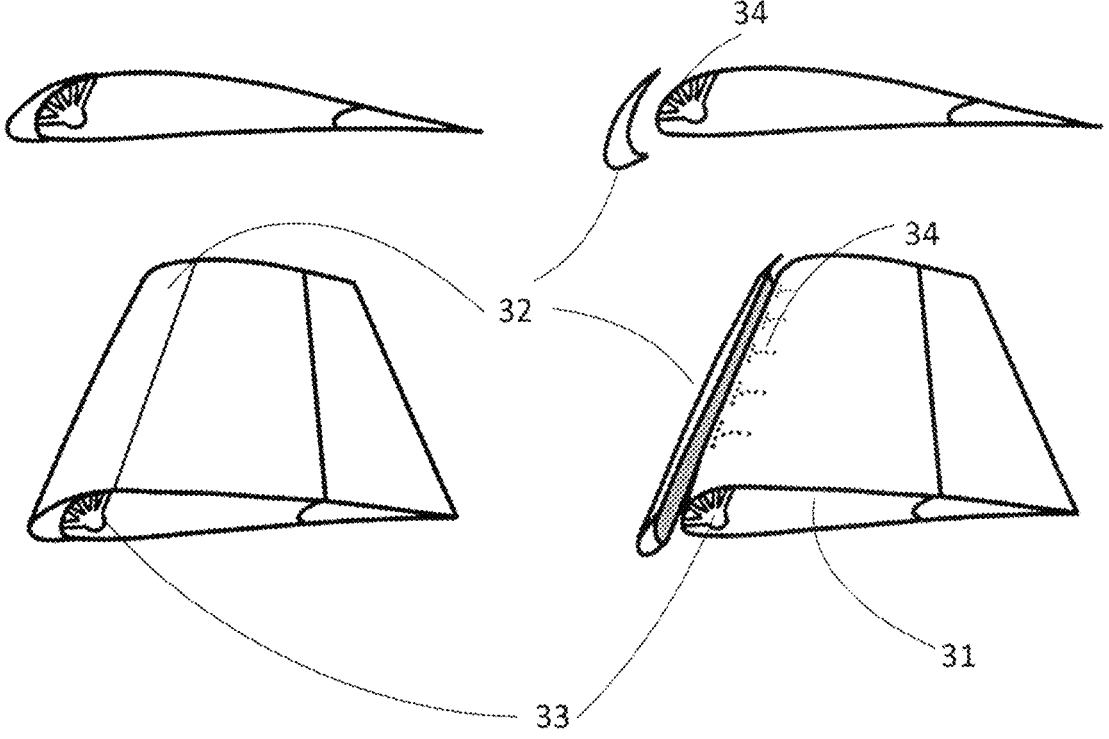
FIG. 3 demonstrates a scheme of nozzle means near leading-edge aerodynamic surface as vortex generator and spoiler, with a predetermined air supply and composite-shaped nozzle outlets in a predetermined arrangement.
Figure 4:
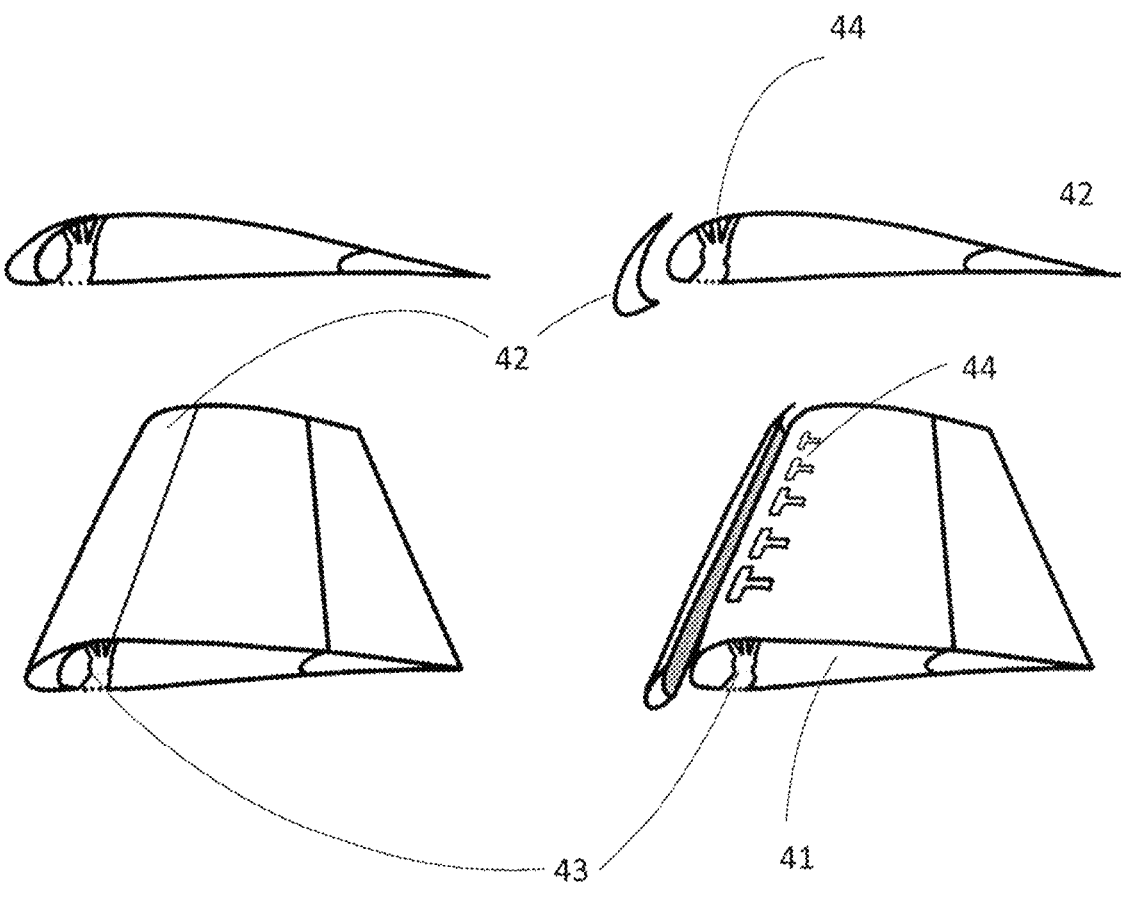
FIG. 4 displays a scheme of nozzle means near leading-edge aerodynamic surface as vortex generator and spoiler, with air pressure differential for air supply and composite-shaped nozzle outlets in a predetermined arrangement.
Figure 5:
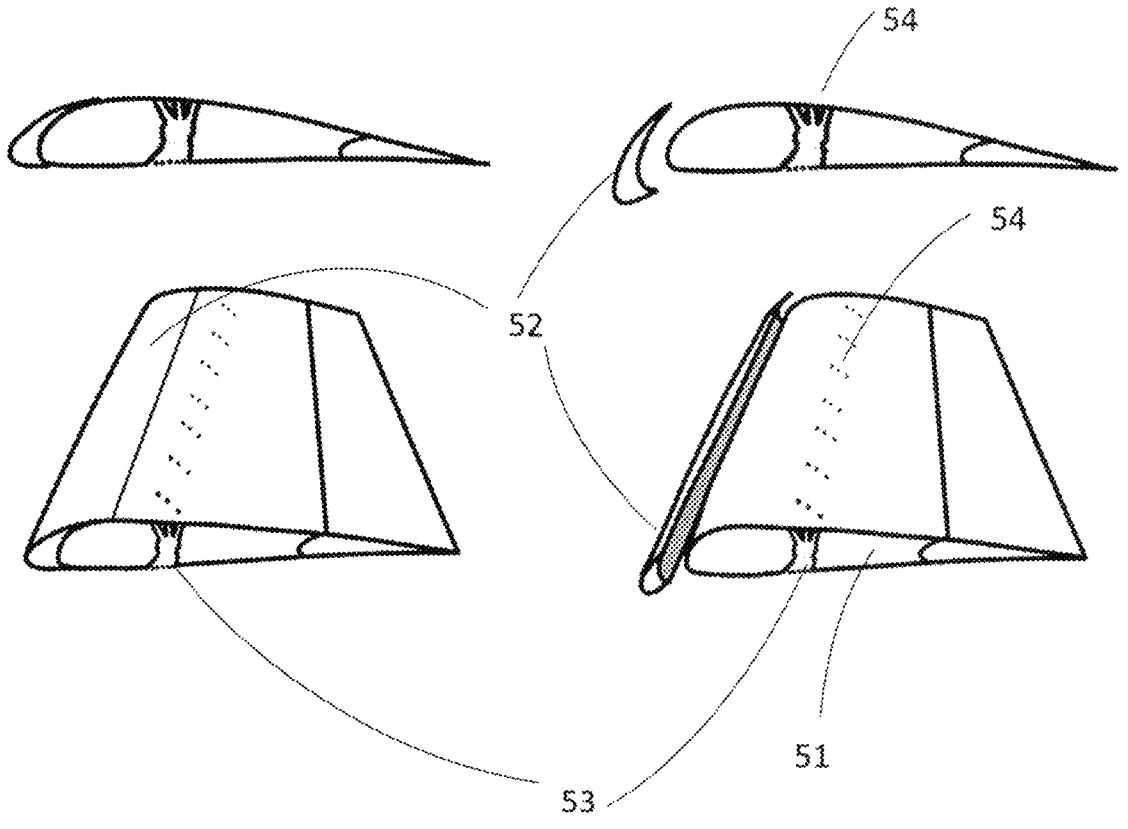
FIG. 5 represents a scheme of lift-body nozzle means on lift body as vortex generator and spoiler, with air pressure differential for air supply and nozzle outlets in a predetermined array.
Figure 6:
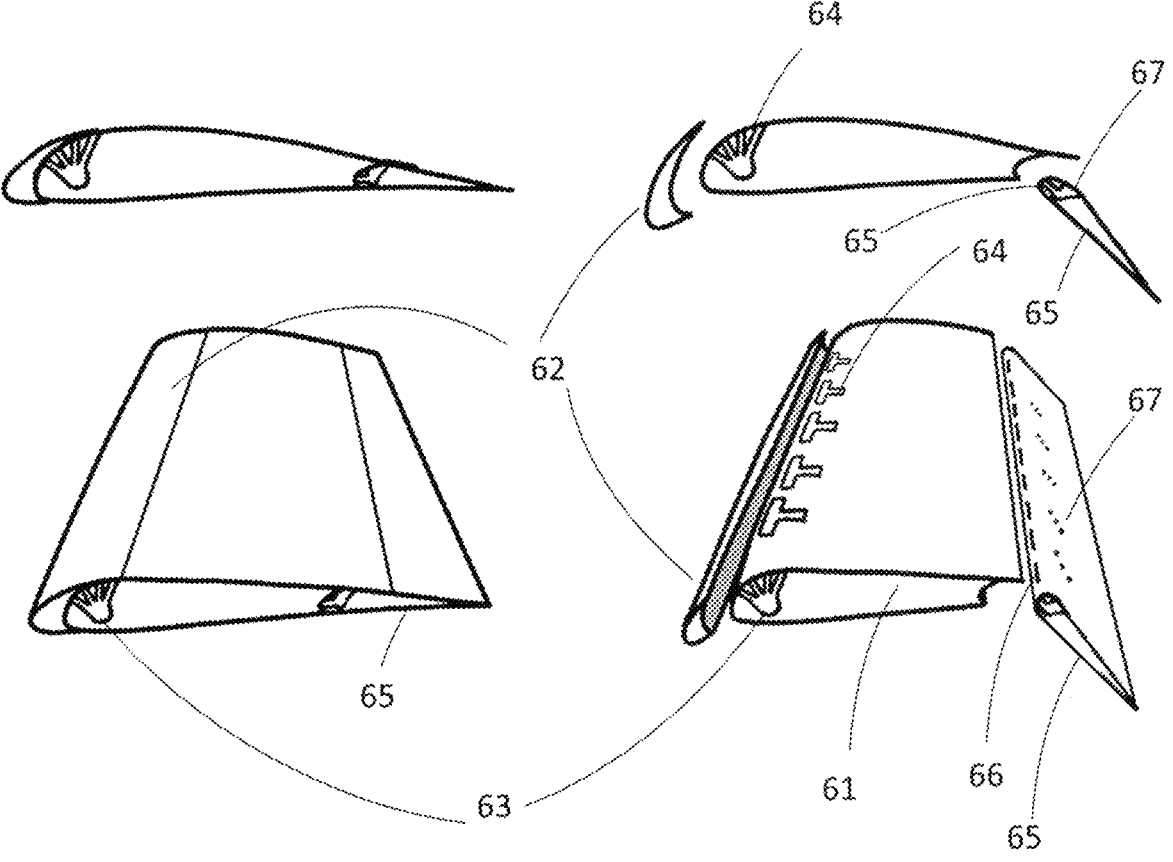
FIG. 6 exhibits a scheme of nozzle means near trailing-edge aerodynamic surface and on lift body as vortex generators and spoilers, with a predetermined air supply and air pressure differential for air supply as well as composite-shaped nozzle outlets in predetermined arrangements.

In order to explain how this invention works, it is worth noting that the term "nozzle means for ejecting at least one stream" and the term "lift-body nozzle means for ejecting at least one stream" carry the same meaning, operate under the same principles, and serve the same purposes and may assume various types, dimensions, configurations, shapes, arrays, structures, orientations, etc., and may comprise various parts, including an inlet (as exemplified by 13 in FIG. 1, 23 in FIG. 2, 33 in FIG. 3, 43 in FIG. 4, 53 in FIG. 5, and 63 & 66 in FIG. 6) and an outlet (as exemplified by 14 in FIG. 1, 24 in FIG. 2, 34 in FIG. 3, 44 in FIG. 4, 54 in FIG. 5, and 64 & 67 in FIG. 6). Said inlet can assume various kinds, including one or a plurality of open slots, ducts, or supply pipelines, and may comprise a variety of dimensions, parts, structures, shapes, configurations, arrays, internal forms, rigid/flexible/variable-geometry structures, or a combination thereof. Similarly, said outlet can assume various types, including one or a plurality of open slots or outlet ducts, and may comprise a variety of dimensions, parts, structures, shapes, configurations, arrays, internal forms, or rigid/flexible/variable-geometry structures, or a combination thereof (as exemplified by 13 & 14 in FIG. 1, 23 & 24 in FIG. 2, 34 in FIG. 3, 54 in FIG. 5, and 66 in FIG. 6). The shape of said outlet may assume a variety of shapes, including round, oval, square, rectangle, triangle, composite, or a combination thereof. As could be illustrated in the accompanying drawings, said nozzle means comprises predetermined dimensions, shapes, parts, structures, configurations, arrays, orientations, angles, etc., so that the movement, which is defined to include any and all motion, move, action, change, maneuver, fluctuation, rotation, or a combination thereof in this "Detailed Description of the Invention, the claims listed below, and other parts of this patent application, of said aerodynamic surface will effectively control, manipulate, or influence said airstreams. Said nozzle means may also comprise a control device (not shown) as needed, including a spring-loaded valve, reed, mechanical, pneumatic, electric, or magnetic mechanism, that operates in a single step, multi-step, or stepless manner, and said control device may be disposed in a predetermined position, e.g., the entrance of said inlet, rear end of said inlet, or somewhere in-between. Said nozzle means, and thus said airstreams from it, can be controlled, manipulate, or influenced, in a single-step, multi-step, or stepless manner, by one or a plurality of predetermined parameters, including air speed, air density, temperature, angle of attack or pitch, air pressure differential between at least two predetermined areas, and configuration, orientation, array, shape, structure, angle of said nozzle means, in addition to the movement, including (full or partial) deployment, retraction and rotation, of said aerodynamic surface. It is also important to bear in mind that said predetermined parameters also cover the corresponding counterparts when other non-solid mediums are used, including air speed, air density, temperature, angle of attack or pitch, air pressure differential between at least two predetermined areas, and configuration, orientation, array, shape, structure, angle of said nozzle means, in addition to the movement, including (full or partial) deployment, retraction and rotation, of any affiliated dynamic surface. Similar to said inlet, said outlet may comprise a control device (not shown) as needed, including a spring-loaded valve, reed, mechanical, pneumatic, electric, or magnetic mechanism, that operates in a single step, multi-step, or stepless manner and may be disposed in a predetermined position, including the entrance of said outlet, rear end of said outlet, or somewhere in-between.

To use an example of air-based embodiments, airstreams (and air jets) from said nozzle means interrupt the flow of incoming air (especially boundary layer airflow) to create vortices and/or turbulence as needed. Consequently, the vortices thus generated can act to delay or reduce the possibility of airflow separation or turbulence as needed, thus achieving the desired aerodynamics. Similarly, said nozzle means (and said lift-body nozzle means) can also interrupt the airflow to such an extent that lift from the affected area is reduced or eliminated that said nozzle means becomes a spoiler (i.e., lift dumper) in effect. Without any doubt, such an approach can be achieved with an adjustable airstream (including adjustments, via adjustable velocity, angle, and volume of the airstream or through adjustable nozzle outlets/openings). In addition to the employment of traditional control mechanisms (e.g., valves, reeds, adjustable air supplies, and so on), the airstream and its characteristics (including ejection speed, ejection volume, ejection angles, ejection pattern, etc.) can also be controlled, manipulated, or influenced by the movement, including (full or partial) deployment, retraction and rotation, of an aerodynamic surface, as said nozzle means is covered up or opened up (fully or partially) by the movement of said aerodynamic surface (as exemplified by 12 in FIG. 1, 22 in FIG. 2, 32 in FIG. 3, 42 in FIGS. 4, and 62 & 65 in FIG. 6). As a result, an airborne vehicle is able to increase its lift when necessary and dramatically reduce its lift when it needs to, with all this being achieved by the movement of its affiliated aerodynamic surface and/or the adjustment of airstreams from its nozzle means. As mentioned previously, a viable control mechanism of said airstream could simply be a spring-loaded valve or a reed (not shown) that opens or closes in a single step, multi-steps, or in a stepless manner, depending on the air pressure differential between at least two predetermined areas. As a result, the function of said vortex generator and spoiler can be operated and controlled automatically either individually, in unison or in cooperation, for instance.

To explain the operational aspect of this invention in more details, said nozzle means can be disposed in a predetermined position, with inlet being in a predetermined position and/or arrangement (including attributes such as angle, orientation, array, shape, and structure), as exemplified by 23 in FIG. 2, 43 in FIGS. 4, and 66 in FIG. 6, and outlet being in a predetermined position and/or arrangement (including attributes such as angle, orientation, array, shape, and structure), as exemplified by 54 in FIG. 5, for effective adjustments of the operating characteristics (including ejection speed, ejection volume, ejection angle, ejection pattern, etc.) of the airstreams from said nozzle means, so that the movement, including (full or partial) deployment, retraction, and rotation, of said aerodynamic surface will effectively control, manipulate, or influence the operation/functioning of said airstreams. By the way, when a predetermined air (similarly water or fluid) supply is used, said inlet could be a pipe line or duct feeding air (similarly water or fluid) into said outlet (as exemplified by 13 in FIG. 1, 33 in FIGS. 3, and 63 in FIG. 6). Said air nozzle means is shielded from said incoming air and thus is in inoperative mode, when said aerodynamic surface (including leading-edge aerodynamic surface or trailing-edge aerodynamic surface) is retracted. However, said nozzle means is "exposed" to said incoming air and thus becomes operative when said aerodynamic surface is deployed fully or partially or rotated fully or partially. As needed, said nozzle means can generate sufficient turbulence that it reduces or eliminate lift of said airfoil (reducing bounce-off during aircraft landing, creating rapid descend, rolling in one direction, restricting wind turbine blade rotational speed, etc.) or said nozzle means can create turbulence and thus operates as an actual airbrake. In designs with a slotted leading-edge aerodynamic surface or a slotted trailing-edge aerodynamic surface deployable on an airfoil (11 in FIG. 1, 21 in FIG. 2, 31 in FIG. 3, 41 in FIG. 4, 51 in FIGS. 5, and 61 in FIG. 6), said nozzle means operates in the same manner as mentioned above.

Said aerodynamic surface being coupled onto said airfoil can be deployed, extended, retracted, or rotated fully or partially via a controllable deployment mechanism that may include mechanical, pneumatic, hydraulic, aerodynamic type, or a combination thereof, etc. It is important to remember that said nozzle means can be partially opened up or covered up by the movement/position of said aerodynamic surface. Needless to say, said aerodynamic surface can also be deployed, extended, retracted, or rotated kinetically by the force of incoming air acting on it, e.g., the aerodynamic force caused from the real-time airspeed or angle of attack, or a combination thereof, which acts as said deployment mechanism, as exemplified in F-86 jet fighter. Said nozzle means can also be opened or closed automatically by air pressure differentials between at least two different areas, such as via said spring-loaded valve or reed (not shown) that opens and closes at a predetermined air pressure differential value in a single step, multi-step, or stepless operation. Also, it is important to note that said nozzle means can be disposed anywhere on said airfoil (including the front, middle, or rear section chordwise, or near tip, close to root spanwise) or on any aerodynamic surface (including leading-edge slat and trailing-edge flap). As elaborated previously, said nozzle means (as exemplified by 14 in FIG. 1 in the form of a plurality of nozzles) can be disposed in a particular arrangement (including attributes such as angle, orientation, array, shape, and structure) and said aerodynamic surface is able to adjust (including by covering or opening up some of said nozzles) the airstream characteristics (including ejection speed, ejection volume, ejection angles, and/or ejection patterns, among other operating characteristics) for a desired performance. This results in the dual functionalities that can be performed by said nozzle means. In other words, said nozzle means can function as a vortex generator as well as a spoiler as needed, even though said nozzle means may only possess one entity.

Another plausible embodiment of this invention is to employ said nozzle means on or near the leading-edge of a flap (including a slotted trailing-edge flap). When said flap is deployed or is rotated, said nozzle means is exposed to incoming airflow and become operative (as exemplified by 65, 66 & 67 in FIG. 6). No control mechanism is absolutely necessary for the operation of said nozzle means, even though some control mechanism could be employed as the situation demands. It naturally follows that under such a design approach said nozzle means can also be employed on or near the leading-edge or trailing-edge of a slat. Moreover, it logically follows that this embodiment is also applicable for a slotted leading-edge slat and a slotted trailing-edge flap where said nozzle means is disposed inside the gap between the slotted leading-edge slat and the airfoil/lift body or inside the gap between the slotted trailing-edge flap and the airfoil/lift body respectively.

It is necessary to point out, at this point, that said airfoil can also possess its own nozzle means, which is, for the purpose of clear distinction, called lift-body nozzle means for ejecting at least one airstream for generation of vortex and/or turbulence, as exemplified by FIG. 5. As stated previously, said lift-body nozzle means operates under the same principles and assumes the same afore-mentioned physical characteristics, attributes, features of said nozzle means. Similar to said nozzle means discussed herein, the characteristics (including ejection speed, ejection volume, ejection angles, ejection pattern, etc.) of said lift-body nozzle means can also be controlled, manipulated, or influenced by the movement, including (full or partial) deployment, retraction and rotation, of said aerodynamic surface and/or by one or a plurality of predetermined parameters, including air speed, air density, temperature, angle of attack or pitch, air pressure differential between at least two predetermined areas (including upper and lower surfaces of an airfoil/lift body and upper and lower surfaces of an aerodynamic surface), and configuration, orientation, array, shape, structure, angle of said nozzle means.

It could be easily seen that this invention is not only applicable to airborne vehicles, but also can be used on land-based vehicles and ocean-going/water-based vehicles. High-performance land-based vehicles commonly employ various kinds of airfoils (including automotive spoilers, wings, deflectors, diffusers) to manipulate passing airflows for increased grip onto the road surface, reduced drag, or enhanced handling, etc. Some of said spoilers or wings can be moved up and down or tilted for different angles of attack according to real-time driving conditions. Certain high-performance cars have simple "non-moveable" vortex generators that are positioned near the rear windows, e.g., vortex generators located at the rear end of the roof on Honda Civic Type-R. But there seems to be several deficiencies in the existing designs that could be corrected for enhanced benefits. In simple words, the first deficiency is that none of the vehicle vortex generators mentioned in this paragraph has any moveable part, let alone being a pneumatic (airstream ejection) type, and consequently said vortex generators operate whenever said vehicles are in motion and constantly increase drag at the same time. Another deficiency is that said vortex generators only serves one purpose, i.e., to generate vortices for improved aerodynamics, thus better handling and increased speed. To correct the afore-mentioned deficiencies, the invention specified in this patent application creates an apparatus that generates vortices (thus generating more down force, for instance) when needed during high-speed runs or increases drag (e.g., via creating turbulence/stall) when desired during slowdown.

The advantages of said apparatus over the traditional spoilers (including non-movable spoilers and movable/tiltable spoilers) can be illustrated by the following plausible embodiment, among other plausible embodiments. If a traditional automotive spoiler is installed at −15 degrees of angle of attack and is able to generate the maximum downforce of 350 kg without causing stall, said apparatus could allow said automotive spoiler to be installed at a higher angle of attach, say −17 degrees, for a maximum downforce of 380 kg without causing stall, as the vortices generated in this way would prevent or delay stall. It could be easily seen that the extra degrees of angle of attack would lead to extra downforce or enhanced handling. A simple control mechanism can be employed to change the operating characteristics of its ejected airstreams to create turbulence, and therefore said automotive spoiler will operate as an airbrake when quick slowdown is desired. When said automotive spoiler is equipped with a moveable/deployable aerodynamic surface, either near the leading edge, trailing edge or somewhere in between, said aerodynamic surface can function to control the operating characteristics of said airstreams in the same manners as in the case of air-based embodiments mentioned previously.

In the simplest embodiments on land-based vehicles, no control mechanism is absolutely needed. Control mechanism, if needed, for said apparatus opens or closes said apparatus in a single step, multi-step, or stepless manner in order to create vortices or turbulence. For instance, when the vehicle speed reaches a certain level, the dynamic air pressure at the forward-facing side of said automotive spoiler exceeds the sprint load and thus said spring-loaded valve (not shown) opens up and ambient air rushes through said nozzle means to create airstreams, thus creating vortices at the rear-facing side of said spoiler. Such said spring-loaded valve (not shown) could also be supplemented with a simple actuator, including, a servo or solenoid (not shown) to change ejection volume and angle to generate turbulence during braking or swift slowdown.

Similarly, other plausible exemplary embodiments may include hydrofoils, vessel propellers, vessel rudders, stabilizers, and other hydro/fluid surfaces, with water-streams or fluid streams serving the same afore-mentioned purposes. Said apparatus can be used to create more lift in water or fluid and/or to create an enormous amount of drag through turbulence generation when rapid slowdown is desired. It shall be understood that an embodiment of this invention can also be a combination of various types of vehicles, including airborne, land-based, and water-based/ocean-going as well as in other fields of applications, including gas turbines, water turbines, wind turbines, and fluid pumps/turbines.

In the cases of gas turbines, water turbines, wind turbines, fluid pumps/turbines, etc., said apparatus can be used to serve a regulating purpose during special conditions, apart from enhancing operative performance during normal operations, i.e., to slow down the rotational speed of these turbine blades to avoid out-of-control situations. For instance, during strong winds, wind turbine blades could easily rotate faster than their designed rotational speed and may face destruction as a result. In order for wind turbine blades to function under all conditions, said apparatus could use air pressure differential to serve at least two purposes: (1) create powerful air jets (consequently vortices) during normal conditions, to enhance lift of said wind turbine blades at a more aggressive pitch (angle of attack) for increased rotational force (extracting more energy from slowly blowing winds), but (2) during strong winds said air pressure differential creates turbulence over said wind turbine blades on purpose to slow down the rotational speed of said wind turbine blades. In a simple design, only the above-mentioned second purpose is pursued to restrict the rotational speed of the wind turbine blades to avoid any destruction. To maintain a simple design and configuration, no control device is needed as said apparatus can easily employ a predetermined design so that it generates beneficial vortices during normal operations (e.g., when wind speed is within the design specifications and thus air pressure differential falls within a desirable range to generate beneficial vortices) but creates strong turbulence during strong winds (e.g., when wind speed is above the design specifications and thus air pressure differential is automatically strong enough to create disruptive air jets to create turbulence). Variations of this embodiment can include said air jets/airstreams being provided by a predetermined air supply, including air supply from ram air effect, air supply via centrifugal force, air supply from a jet engine, air supply from air tank/pump/compressor/fan. Said air supply can be provided by various methods or a combination thereof, such as said wind turbine blades, when rotating, draws in ambient air, via centrifugal force, through an opening near the root of said wind turbine blades into their hollow interior space to create an air supply. Ram air effect can also be used for this purpose. An air pump can also be employed to provide a source of air supply. It may also be applicable and beneficial to use the above-mentioned methods, including air pressure differential, to attain enhanced performance individually, supplementally, cooperative, intermittently, or alternately.

It could also be easily seen that the afore-mentioned spring-loaded valves or reeds (not shown) can be used in this or similar embodiments, applications and products. Said spring-loaded valves or reeds (not shown) are disposed in predetermined positions and/or arrangements (including attributes such as angle, orientation, array, shape, and structure) on said wind turbines and can be made to open up when the air pressure differential or air supply reaches a predetermined level. The opening-up can be in a predetermined orientation/direction, such as forward or towards the incoming airflow, thus reducing lift or causing stall to slow down the rotational speed of said wind turbines. Likewise, said spring-loaded valves or reeds (not shown) could be made to close when air pressure differential reaches a predetermined level, which, for instance, eliminates vortices on said wind turbine blades (i.e., reducing rotational force) or creates stall of said wind turbine blades partially or fully, for the purpose of reducing the rotational speed, etc. By the way, said spring-loaded valves and said reeds could, in effect, function as physical airbrakes when opening up towards the incoming airflow, for instance when they somehow resemble the shape/structure of a physical structure. Needless to say, other types of simple control devices could also be used, including a control device based on air pressure vs. gravity, a control device based on centrifugal force vs. air pressure, or a control device based on centrifugal force vs. spring load, or a control device based on centrifugal force alone. It may also be valuable to install, on said wind turbine blades, an aerodynamic surface that may even have said nozzle means to enhance performance of said wind turbine blades as well as to operate as a control device of airstreams, as in the cases of the afore-mentioned air-based embodiments (i.e., wing/flap and wing/slat configurations). The advantage of this embodiment in wind turbine blades is that said wind turbine blades can be simple, non-adjustable-pitch type, instead of having a complicated, costly pitch-adjustment mechanism needed to change the pitch of said wind turbine blades during hazardous conditions.

Recap And Final Note

To summarize, the main advantages offered by this invention include, but are not limited to, the following: First, vortex generation on demand is achieved by airstreams from said nozzle means (and/or said lift-body nozzle means) only when needed, which is evidently manifested by the fact that said nozzle means only becomes operative from the movement, including (full or partial) deployment, retraction and rotation, of said aerodynamic surface (e.g., leading-edge aerodynamic surface and trailing-edge aerodynamic surface, or both, independently or cooperatively) or when air pressure differential reaches a predetermined level. This is highly valuable and practically desirable, as there is no penalty of increased drag when vortex generation is not needed, which makes this invention suitable not only for low-speed full-sized airplanes and radio-controlled airplanes, but also for high-speed full-sized airplanes, high-speed vehicles, and vessels as well. Second, simplicity in design and control is achieved, for said apparatus does not have to require a separate control mechanism, even though a separate control mechanism could be employed. This means simple structure, light weight, and low production cost, especially in the case of air pressure differential being utilized to create and/or control said airstreams. Third, said apparatus can operate a vortex generator, a spoiler or a combination thereof, which is specifically useful in regulating operations of some aerodynamic vehicles/devices e.g., glider, cargo transporter, and wind turbine blades.

The foregoing description of my invention, the accompanying drawings, and descriptions throughout this patent application only illustrate some of the exemplary, possible, or plausible embodiments, applications and products of this invention, while the true scope of this invention, as set forth in the claims listed below, is intended to include any and all possible or plausible functionalities, applications, configurations, options, modifications, embodiments, and combinations/sub-combinations thereof, and is not limited to those of the examples, applications, configurations, options, embodiments, and functionalities described above and in other parts of this patent application. Similarly, said drawings shall be considered as illustrative in nature and shall not be interpreted to be as restrictive as graphically depicted, and the features, configurations, options, functionalities, and embodiments that are shown in said drawings or are described above can be combined in a design, application, embodiment, or product as needed. More importantly, no limitation shall be interpreted from, inferred from, deduced from, derived from, implied by, or meant to exist by the verbiage practices and descriptive approaches used throughout this patent application. Any limitations that may be inferred, deduced, or perceived throughout this patent application, including in the Abstract, the Summary, and this "Detailed Description of the Invention", but are not explicitly stated in said claims, shall not be incorporated into said claims, singly or collectively, by implication, inference, or otherwise; and any possible applications or implications of said limitations, or the combination thereof, shall not be considered as applicable.

I claim:

1. An apparatus to function passively as a vortex generator and a spoiler, comprising:
   a lift body generating dynamic force when in relative motion against a non-solid medium, including air, gas, water, fluid, or a combination thereof,
   said lift body comprising a plurality of nozzles for ejecting at least one stream,
   said lift body comprising a plurality of dynamic surfaces being coupled onto said lift body and being deployable, and
   said plurality of nozzles being arranged spanwise along the dynamic surfaces and operative from the movement of said plurality of dynamic surfaces; wherein
   said plurality of nozzles are disposed in predetermined positions to allow movement of said plurality of dynamic surfaces to control, manipulate, or influence the characteristics of said at least one stream according to a pressure differential between at least two predetermined areas.

2. The apparatus of claim 1 wherein said lift body is further defined as belonging to the group of airfoils and fluid-foils which includes an aircraft wing, an aircraft horizontal tail, an aircraft vertical tail, a propeller, a stabilizer, an automotive spoiler, diffuser, a turbine blade, a fan blade, a wind turbine blade, a sail, a vessel rudder, and a hydrofoil.

3. The apparatus of claim 1 wherein said plurality of dynamic surfaces are further defined as belonging to the group of aerodynamic surfaces and fluid-dynamic surfaces which includes a leading-edge slat, a trailing-edge flap, a slotted leading-edge slat, a slotted trailing-edge flap, a wing slat, a wing flap, a flaperon, an aileron, an elevator, an elevon, a hydrofoil slat, a hydrofoil flap, and a rudder.

* * * * *